United States Patent [19]
Gillingham et al.

[11] 4,452,616
[45] Jun. 5, 1984

[54] SELF-CLEANING AIR CLEANER

[75] Inventors: Gary R. Gillingham, Prior Lake; Fred H. Wahlquist, Richfield, both of Minn.

[73] Assignee: Donaldson Company, Inc., Minneapolis, Minn.

[21] Appl. No.: 364,535

[22] Filed: Apr. 1, 1982

Related U.S. Application Data

[63] Continuation of Ser. No. 204,579, Nov. 6, 1980, abandoned, which is a continuation-in-part of Ser. No. 020,477, Mar. 14, 1979, abandoned.

[51] Int. Cl.³ .................... B01D 46/04; B01D 46/52
[52] U.S. Cl. ........................ 55/302; 55/484; 55/498; 55/521
[58] Field of Search .................. 55/302, 418, 462, 463, 55/498, 484, 521

[56] References Cited

U.S. PATENT DOCUMENTS

| 722,272 | 3/1903 | Baker | 55/462 |
|---|---|---|---|
| 1,337,564 | 4/1920 | Orem | 55/462 |
| 3,421,295 | 1/1969 | Swift et al. | 55/341 HMB |
| 3,509,698 | 5/1970 | Medcalf et al. | |
| 3,594,992 | 7/1971 | Carr et al. | |
| 3,816,978 | 6/1974 | O'Dell | |
| 3,816,979 | 6/1974 | Wales | |
| 3,874,857 | 4/1975 | Hunt et al. | 55/302 |
| 3,884,657 | 5/1975 | Rebours et al. | |
| 4,007,026 | 2/1977 | Groh | 55/302 |
| 4,077,781 | 3/1978 | Sundstrom | |
| 4,171,963 | 10/1979 | Schuler | 55/302 |
| 4,218,227 | 8/1980 | Frey | 55/302 |
| 4,331,459 | 5/1982 | Copley | 55/302 |

FOREIGN PATENT DOCUMENTS 1657124  1/1970  Fed. Rep. of Germany ........ 55/302

OTHER PUBLICATIONS

"Flex-Kleen Custom Engineered Dust Collectors", Bulletin No. T-7, Flex-Kleen Corp., Chicago, Ill.

Primary Examiner—Kathleen J. Prunner
Attorney, Agent, or Firm—Merchant, Gould, Smith, Edell, Welter & Schmidt

[57] ABSTRACT

An improved selfcleaning air filter (2) of the pulse jet type. The filter includes at least one filter element (20) located in a dirty air plenum (6) which is separated from a clean air plenum (8) by a partition (10). A nozzle (70) directs a cleaning jet of gas that moves in a back flow direction along the filter element to remove accumulated contaminants therefrom. A diffuser is located in the clean air plenum for diffusing the cleaning jet of gas to convert the cleaning jet to a high volume, low pressure jet which substantially fills the entire cross-sectional area of the filter element at the element outlet.

9 Claims, 8 Drawing Figures

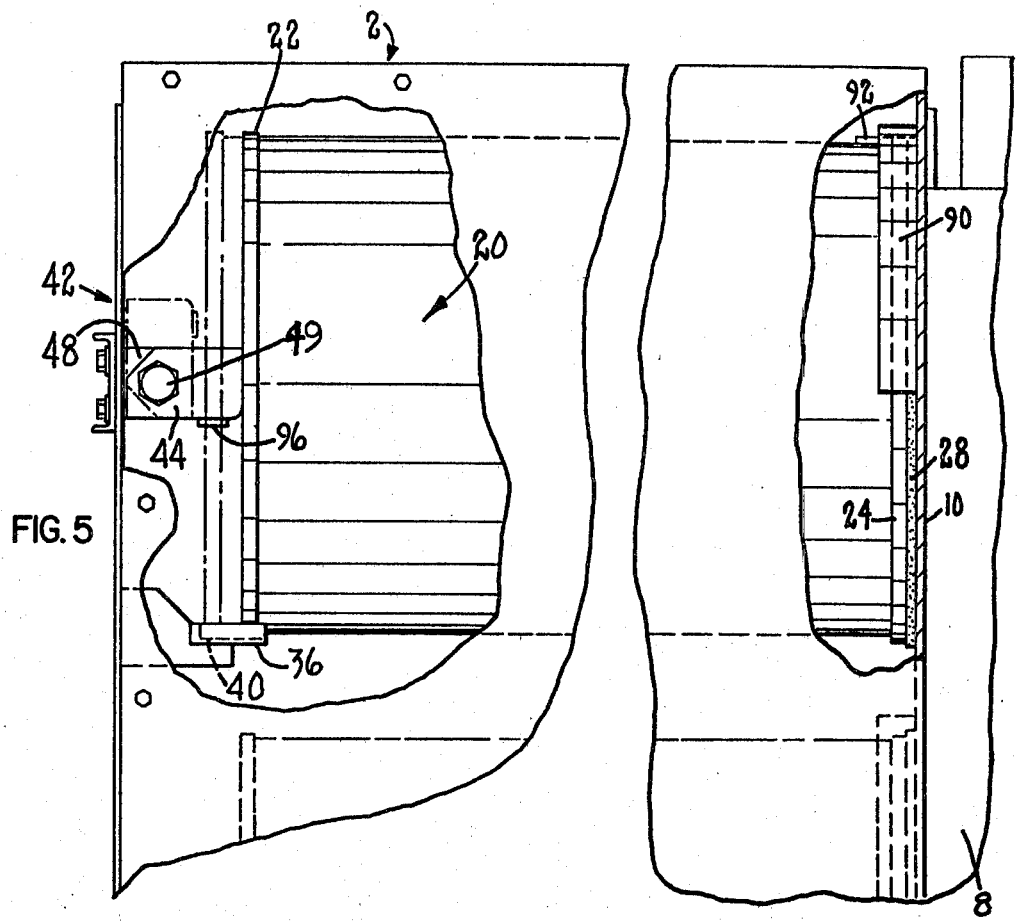
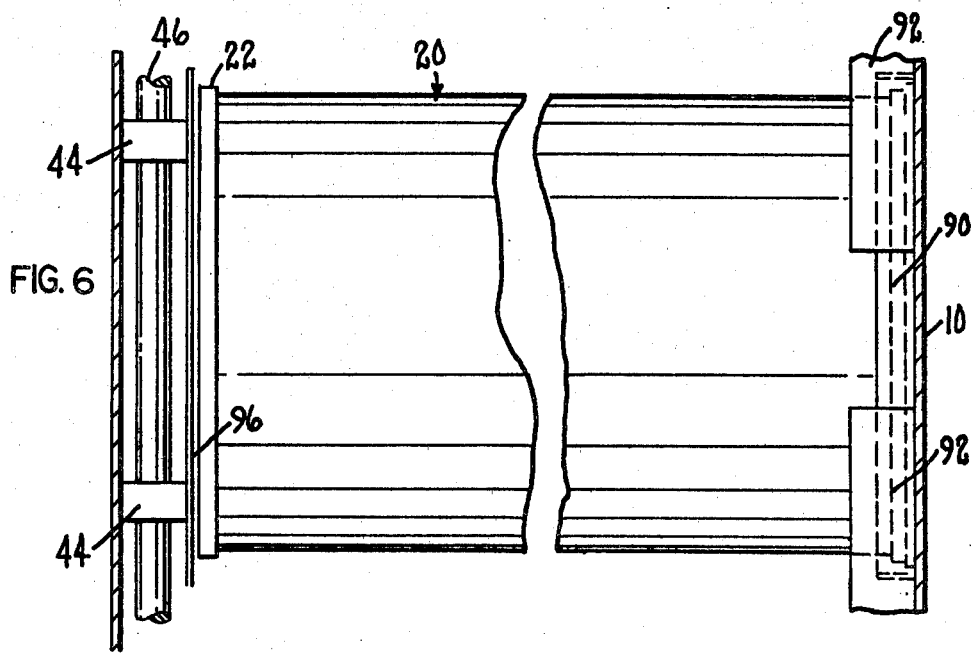

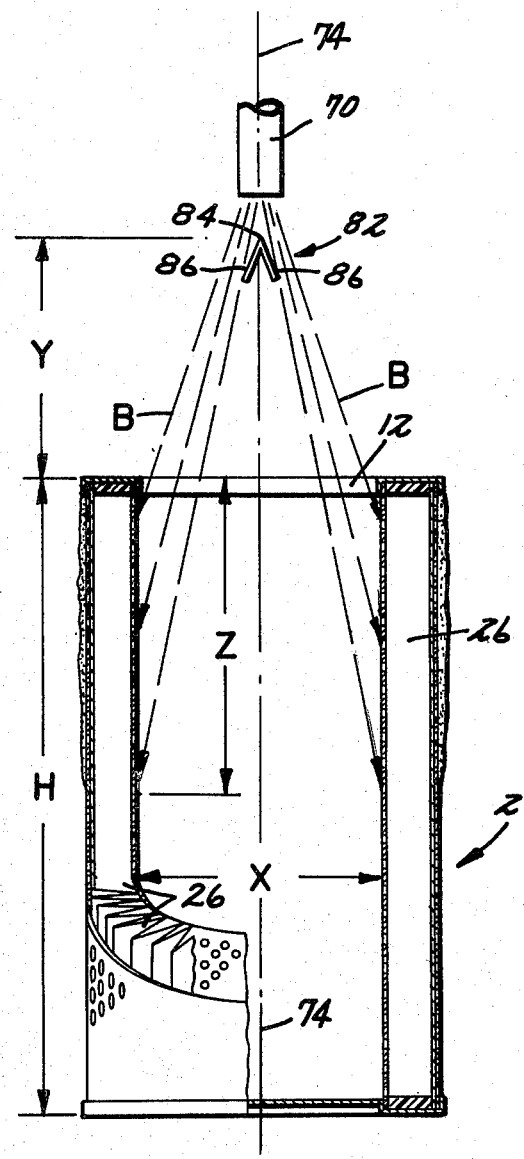
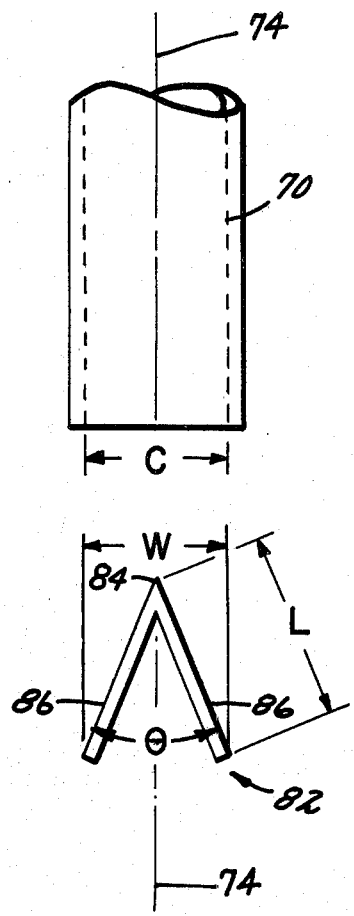

SELF-CLEANING AIR CLEANER

This is a continuation of application Ser. No. 204,579, filed Nov. 6, 1980, which is a continuation-in-part application of parent application Ser. No. 020,477, filed Mar. 14, 1979, both abandoned.

TECHNICAL FIELD

The invention relates generally to a self-cleaning air filter of the pulse jet type. As such this invention is useful in any engineering application which requires the filtering of particulate contaminants, e.g. dust, sand particles, etc. Such applications might include atmospheric filtering operations for internal combustion engines and the like. More particularly, the air filter which will be specifically disclosed in this application has been designed for use with the power plants of railroad locomotives.

DESCRIPTION OF THE PRIOR ART

Air filters are widely used for many purposes. For example, they have long been used for filtering the intake air used in the combustion cycle of an internal combustion engine. In addition, various other types of equipment often require some type of air filter. Moreover, air filters are often used in industrial applications, e.g. flour mills, for filtering the atmospheric air which is breathed by the plant workers. These latter applications have become more widespread with the advent of various laws regulating environmental conditions in industrial plants.

Eventually, any filter medium which is used becomes clogged or "caked" with the various particulate contaminants which have been filtered. This clogged condition is often referred to as one in which the filter element is "loaded." If there were no effective way of cleaning the filter medium after it is loaded, the medium would have to be discarded after a single use. This is economically wasteful. It is preferable to periodically clean and then reuse the filter medium.

Various types of self-cleaning air filters have long been known. These filters can remove accumulated contaminants from the filter medium which greatly extends the useful life of the medium. One method often used in the gas filtering industry to remove contaminants from a filter is to periodically reverse the direction of fluid flow through the medium. The contaminant then releases from the medium as large agglomerates which settle into a collecting chamber where they can be removed.

One type of apparatus which is commonly used in a reverse flow self-cleaning air filter is one which may be referred to as a pulse jet type of air filter. In this filter, a pulse of compressed gas is released from a storage reservoir by a valve. The valve forms a jet of gas which is directed towards the filter medium. This jet of gas first usually enters a venturi which is located immediately above the filter element. The low pressure at the venturi throat effectively causes the ambient air surrounding the filter element to be drawn in with the pulse jet and directed downwardly into the filter in a "back flow" type of operation. Thus, the venturi effectively converts a small volume of high pressure air into a large volume of low pressure air which travels down the filter medium.

However, the venturi type of apparatus noted above has a number of distinct disadvantages. It is useful primarily in what might be called low performance environments. Such environments are characterized by (1) a relatively large amount of space in which to mount the filter, and (2) a relatively low primary air flow velocity through the filter. For example, in a typical low performance application in an industrial environment (e.g. a flour mill), lots of room is usually available for the filter to be installed. Thus, size is not a critical parameter for the filter. In addition, the average air flow velocity through the outlet of each filter element is usually 25 ft/sec or less. A venturi is not usually suitable in a high performance application. Space is an important consideration in such applications and the average air flow velocity through the outlet of each filter element is on the order of 50 ft/sec or more. A filter for the engine or power plant of a railroad locomotive can be classified as a high performance application.

In high performance applications as identified above, a venturi type of pulse jet cleaning system isn't suitable for a number of reasons. First, the venturi is usually positioned inside the clean air plenum and is usually quite long and bulky. Thus, the venturi design requires a certain minimum amount of space for installation. This does not allow for a compact air cleaner design as is required in these applications. Secondly, at the higher average air flow velocities which are encountered in a typical high performance application, the pressure drop occurring across the conventional venturi becomes much greater. In fact, the pressure drop is often so large that the engine to which the filter is attached has to expend a considerable amount of energy in causing air to flow through the filter. This increases the fuel consumption and decreases the power output of the engine which is obviously undesirable.

Consequently, there is a need for some type of system for use in a pulse jet self-cleaning air filter which would serve to diffuse the high pressure jet of air, but which does not have the disadvantages of a venturi. Several prior art patents have suggested various types of diffusers. For example, U.S. Pat. No. 3,509,698 to Medcalf et al discloses a cone which is mounted below the pulse jet nozzle for spreading the air out into the filter element in a propagating wave form. However, the cone in the Medcalf arrangement is mounted inside a tubular extension or nozzle mounted on the top of the filter element. As such, Medcalf does not have many advantages over a typical venturi. The tubular extensions add substantially to the height of the filter element. In addition, the cones restrict normal air flow through the filter during all air filtering operations since they are mounted inside the tubular extensions. This is true of other patents, such as U.S. Pat. No. 3,594,992 to Carr, which disclose similar types of diffuser members. All of these diffusers are located in such a manner as to restrict the normal air flow through the filters and, therefore, are not suitable for high performance filtration applications.

Furthermore, most of the self-cleaning pulse jet types of air filters include a plurality of filter elements which are located in the dirty air plenum and have one end connected around an outlet opening in a dividing wall which forms both the dirty and clean air plenums. Some of the means used to support the filter element may be quite complicated. Thus, the filter elements may take a great deal of time to install or replace inside the filter housing. There is a need for simple supporting means for the filter elements inside the filter housing which can be used to quickly and easily replace the filter elements. In addition, in any high performance filter application, the supporting means for the filter elements must be compact.

SUMMARY OF THE INVENTION

One aspect of this invention relates to a pulse jet self-cleaning air filter having means for diffusing the jet of gas to substantially fill the cross-sectional area of the filter element at the element outlet opening. The diffusing means is located in the clean air plenum so as not to restrict the normal air flow through the filter during air filter operations.

In addition, another aspect of this invention is an air filter having means for quickly and easily aligning and securing one or more filter elements inside the filter housing.

The air filter of this invention comprises a housing which includes a dirty air plenum and a clean air plenum defined by a partition having at least one outlet opening therein. A pleated media filter element is installed inside the dirty air plenum with one end of the filter element being sealed around the outlet opening. Means for generating a cleaning jet of gas and for directing that jet into the filter element is provided. A diffuser is mounted in the clean air plenum. The diffuser serves to spread the jet of compressed gas to substantially fill the cross-sectional area of the filter element nearest the outlet opening but because of its size and location does not appreciably restrict the normal air flow through the air cleaner.

The air filter of this invention relates to an improved means for supporting the filter elements inside the dirty air plenum of the housing. This supporting means comprises a pair of spaced, elongated rails on which the ends of each filter element roll. Each rail has a shallow concave seating area which receives the filter element therein. The filter element can be laterally slid in each of the seating areas such that the filter element can be sealed around one of the outlet openings in the separating partition.

BRIEF DESCRIPTION OF THE DRAWINGS

The present invention will be described hereinafter in the detailed description, when taken in conjunction with the following drawings, in which like reference numerals refer to like elements throughout.

FIG. 5 is a partial side elevational view of the improved air filter shown in FIG. 1, particularly illustrating the means for supporting one of the filter elements including the means for forcing the filter element laterally to seal against the separating partition of the air filter;

FIG. 6 is a partial top plan view of the improved air filter shown in FIG. 1, particularly illustrating one of the filter elements therein;

FIG. 7 is a sectional view illustrating the improved diffuser means and the filter element, portions thereof shown in elevation; and FIG. 8 is a diagrammatic view illustrating the geometry of the improved diffuser means.

DETAILED DESCRIPTION

Figure 1:
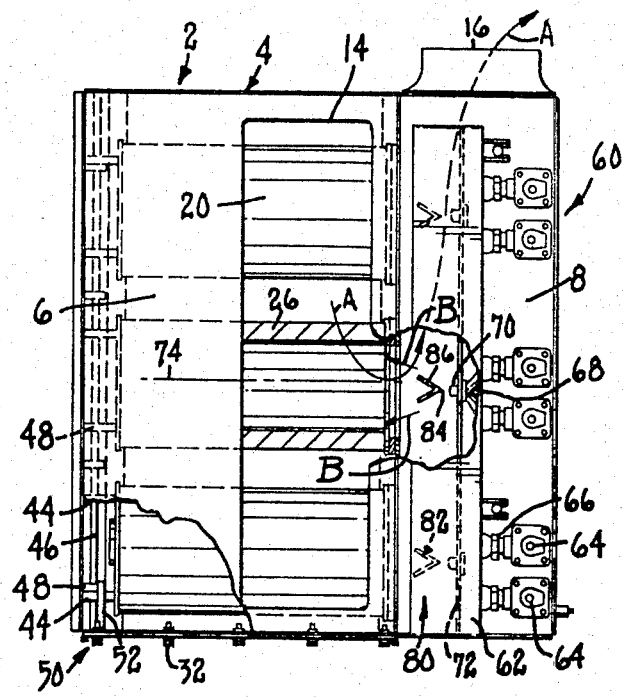
FIG. 1 is a top plan view of an improved self-cleaning air filter according to this invention, with portions of FIG. 1 being broken away to illustrate various of the components of the air filter including the cleaning jet and its associated diffuser means.

This invention comprises an improved self-cleaning air filter of the pulse jet type having a number of novel features. An air filter according to this invention is generally indicated as 2 in the drawings. Air filter 2 as disclosed herein is designed for use in filtering the intake air for the power plant of a railroad locomotive. However, air filter 2 is not limited for use with locomotives. In fact, filter 2 may be used with conventional internal combustion engines or for any other appropriate air filtering purposes such as atmospheric air filtering in various industrial applications. However, air filter 2 is primarily designed for high performance applications, i.e. applications requiring a compact air filter design and having relatively high average velocities of air flow, e.g. 50 ft/sec or more, through the element outlet.

Air filter 2 comprises a filter body or filter housing generally designated as 4. Housing 4 includes a substantially rectangular "dirty air" plenum 6 and an adjoining rectangular "clean air" plenum 8. "Dirty air" and "clean air" are terms of art which refer, respectively, to a gas that is laden with various particulate contaminants and a gas which is not laden with these contaminants and which has been filtered. A separating partition or dividing wall 10 in housing 4 fluidically isolates dirty air plenum 6 from clean air plenum 8 except insofar as a plurality of substantially circular outlet openings 12 are concerned. The purpose of the outlet openings 12 contained in wall 10 will be described hereafter.

A substantially rectangular air intake 14 is provided in dirty air plenum 6 to allow contaminant laden or dirty air to pass into the plenum. Similarly, an air outtake 16 is located in clean air plenum 8 for conducting clean filtered air outwardly. Air filter 2 will be suitably connected to the power plant of a locomotive engine (not shown). Air will be sucked through filter 2 during an air filtering operation with the air passing into air intake 14, through the dirty air plenum 6, into the clean air plenum 8, and outwardly through the clean air outtake 16. The direction of this air movement is generally indicated by the arrows A.

Figure 2:
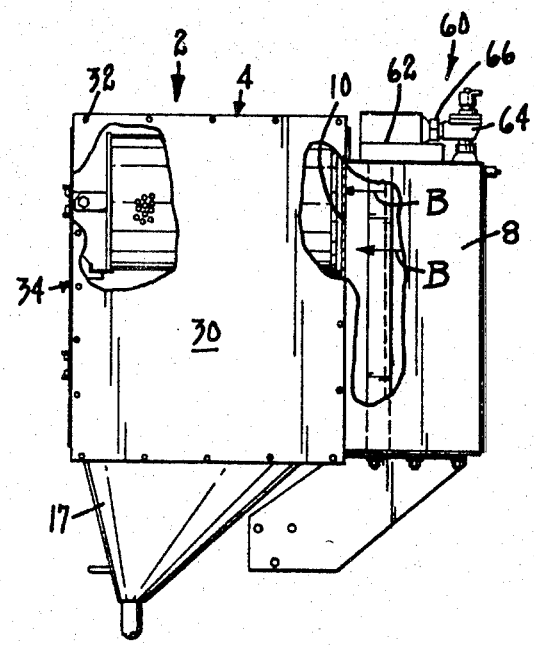
FIG. 2 is a front elevational view of the improved air filter shown in FIG. 1 as that filter is normally installed.
Figure 3:
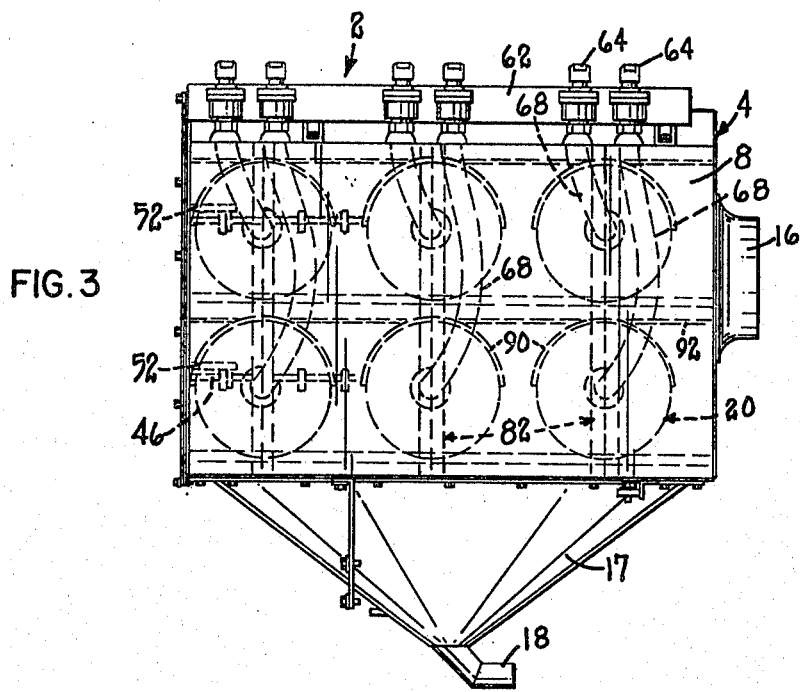
FIG. 3 is a side elevational view of the improved air filter shown in FIG. 1 as that filter is normally installed.

The bottom of dirty air plenum 6 is open and leads to a contaminant collecting hopper generally indicated as 17 in FIGS. 2 and 3. An outlet conduit 18 is connected to the contaminant collecting hopper at the very bottom thereof. Any suitable contaminant removal device (not shown) may be located at the bottom of hopper 17 adjacent conduit 18. Hopper 17 serves to collect contaminants which have been cleaned from a plurality of filter elements contained in dirty air plenum 6. The removal device and the conduit 18 serve to remove the contaminants which have been separated from the filter element. This structure is typical of many conventional pulse jet self-cleaning air filters.

A plurality of filter elements, generally designated as 20, are releasably mounted inside dirty air plenum 6 for filtering the air passing therethrough. Each filter element 20 is generally identical. Referring to FIG. 1, filter element 20 includes a hollow, cylindrically shaped filter medium 26 made from any generally conventional filter materials. For example, filter medium tube 26 is preferably comprised of a longitudinally pleated paper filter medium. The use of pleated filter media allows the placement of a large quantity of filter medium in a short element cartridge, thereby allowing a compact design of the element. Referring to the arrows A, air which is being filtered passes from the exterior of the filter element 20 into the interior hollow bore of the cylindrical filter medium 26. Thus, the contaminants which have been filtered from the air will be retained on the exterior surface of the filter medium 26.

Pleating the filter element medium results in a cartridge element having sufficient compressive strength to permit retention of the element in the housing other than by using a collar-type retention means as is commonly used with nonpleated bag-type elements. The opposed ends of pleated filter medium 26 are respectively fixedly bonded to cylindrical end plate 22 and annular end plate 24. In effect, end plates 22 and 24 form rims for the filter element 20 on which filter element 20 can be rolled. The end plate 24 has a circular opening and is designed to mate with the outlet opening 12 in wall 10. A circular gasket 28 is located on the exterior surface of end plate 24. Gasket 28 is slightly larger than the diameter of outlet openings 12 and is designed to seal between end plate 24 and wall 10 in an air-tight manner when the filter element 20 is forced against wall 10 as described in more detail hereafter.

The radial velocity of the cleaning air will only be significant if a large percentage of the total amount of media in each element is subjected to the radial velocity. It is impossible to direct high radial velocities at a large portion of the media with the nozzle/diffuser geometry disclosed herein if the filter element has a large length/inside diameter ratio. It has been found that for the radial velocity to be of benefit, the length/inside diameter ratio of the filter element must not be larger than 5. This requirement dictates the use of pleated media elements in high performance applications. Also, collar type retention mechanisms used with bag type filter elements would seriously reduce the amount of media exposed to the radial cleaning air thereby decreasing the effectiveness of the nozzle/diffuser type pulse generation system. As previously mentioned, the use of pleated media allows retention without using a mounting collar.

Figure 4:
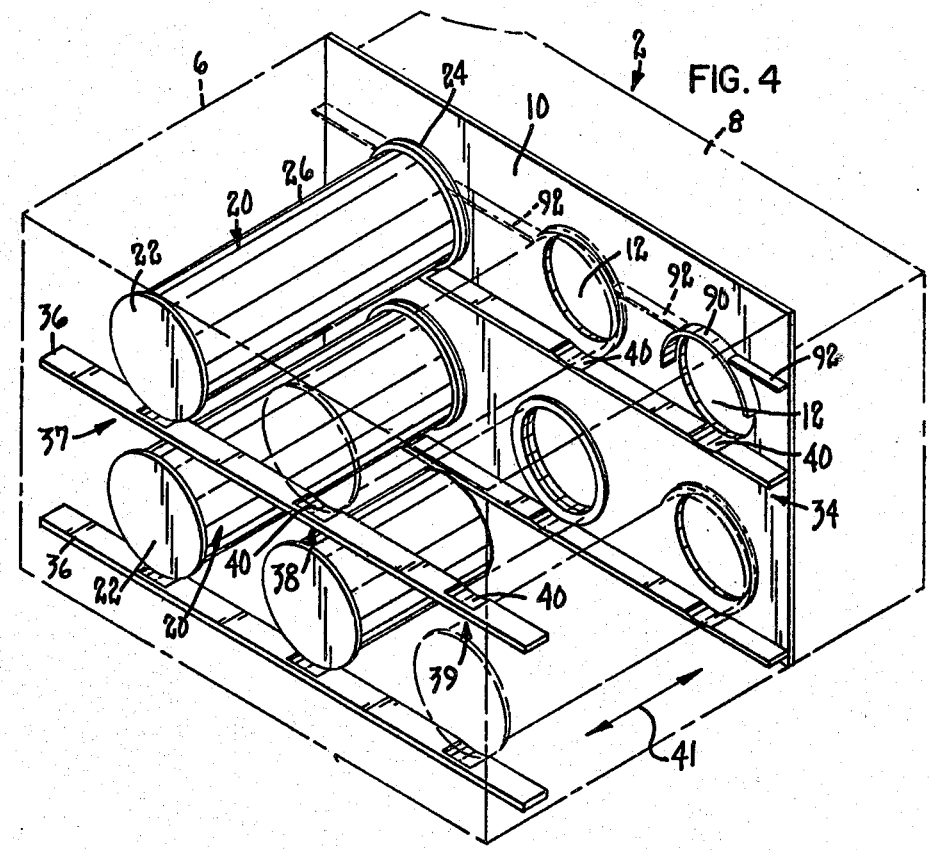
FIG. 4 is a partial perspective view of the improved air filter shown in FIG. 1, particularly illustrating the means for supporting the filter elements inside the dirty air plenum.

One side of the dirty air plenum 6 is closed by a removable access cover 30. Access cover 30 is removably attached to dirty air plenum 6 by a plurality of bolts, screws or the like generally designated as 32. As shown in FIG. 4, there are six outlet openings 12 provided in the wall 10. These outlet openings 12 are arranged in two rows of three openings each. Thus, a rectangular array of six filter elements 20 is designed to be contained inside dirty air plenum 6. Each filter element 20 will seal around one of the outlet openings 12.

An improved means for supporting the filter elements 20 inside dirty air plenum 6 is generally indicated as 34. Supporting means 34 includes two spaced and elongated support members or rails 36. Support members 36 are fixedly mounted respectively on opposed side walls of the dirty air plenum 6. There are two pairs of these support members 36 with one pair being provided for each row of the filter elements 20. Thus, three filter elements 20 are supported on each pair of support members 36, as shown in FIGS. 3 and 4.

Support members 36 include means for securely seating each filter element 20 thereon in an alinged relationship with one of the outlet openings 12. This seating means includes three pairs 37, 38 and 39 of concave shaped recesses 40 located in the upper surfaces of support members 36. The recesses 40 in each pair 37, 38 and 39 are located on the opposed support members 36 and aligned with one another. Thus, one recess 40 is provided for each end plate 22 and 24 of filter elements 20. The shape of the recesses 40 corresponds to the peripheral shape of the end plates 22 and 24 to allow filter elements 20 to become seated in the recesses. In addition, recesses 40 are laterally elongated in a lateral direction indicated as 41. This allows the filter elements 20 to be laterally movable relative to support members 36.

In addition, supporting means 34 includes a selectively actuateable means, generally indicated as 42 in FIG. 5, for laterally sliding or forcing each filter element in the lateral direction 41 towards dividing wall 10. This forcing means 42 comprises a plurality of rotatable cams 44 which are designed to engage against the end plates 22 of each filter element 20. Two cams 44 are provided for each filter element 20. Cams 44 are fixedly mounted on an elongated shaft 46 which passes through the dirty air plenum 6. Shaft 46 is rotatably journalled inside the dirty air plenum 6 by means of suitable bearing blocks 48. Two such shafts 46 are mounted in plenum 6 for use with each row of the filter elements 20 on the vertically spaced pairs of support members 36. See FIG. 3. The end of shaft 46 carries a conventionally shaped bolt head 49 located inside plenum 6. Shaft 46 can be manually rotated by applying a wrench to bolt head 49 and rotating the wrench. Rotation of shaft 46 will rotate the cams 44 from an inoperative position, shown in solid lines, at which cams 44 engage filter elements 20.

To install filter elements 20 in dirty air plenum 6, across cover 30 is first removed. Each filter element 20 is then placed onto the support members 36 with each end plate 22 and 24 being respectively received on the top surface of one of the support members 36. Filter elements 20 are then simply rolled along support members 36 by virtue of the rolling engagement between the circular end plates 22 and 24 and the top surface of the support members 36. Whenever the filter element 20 comes to one pair 37, 38 or 39 of the recesses 40, filter element 20 becomes seated in the recesses 40 and stops rolling. However, the filter element 20 can be manually pushed out of the recesses 40 to continue rolling down the support members 36 until all three pairs 37, 38, and 39 of the recesses 40 in each row are filled with filter elements 20. Thus, six filter elements 20 are installed on the two pairs of support members 36 by simply rolling the filter elements 20 down the support members until they become properly seated in the appropriate pair of the recesses 40. During this placement of filter elements 20, cams 44 are rotated into their inoperative position. In this position the cams 44 clear the end plates 22 allowing the filter elements 20 to be installed on support members 36.

After all six filter elements 20 are installed on the support members 36 and are received in one pair of the recesses 40, the shaft 46 is manually rotated by applying a wrench to bolt head 49. This causes cams 44 to be moved from their inoperative position to their operative solid line position in FIG. 5. In the operative position of the cam 44, they engage the end plates 22 and slide the entire filter element 20 in the lateral direction 41. Because the recesses 40 are laterally elongated, the necessary lateral movement of filter element 20 is allowed. This lateral movement will force end plate 24 toward dividing wall 10. This compresses gasket 28 around one of the openings 12 and effects an air-tight seal of the end of filter elements 20 relative to wall 10. Cams 44 securely lock the filter elements 20 in place against wall 10. Thus, when both of the shafts 46 have been rotated as noted above, all of the filter elements 20 will be sealed against one of the outlet openings 12. Access cover 30 may then be reinstalled on the dirty air plenum 6. Air filter 2 is then ready for an air filtering operation.

An interlock means 50 is provided on access cover 30 for preventing the cover 30 from being installed if filter elements 20 have not been locked into position against the dividing wall 10. Interlock means 50 simply comprises two horizontally extending fingers or latches respectively identified as 52 in FIGS. 1 and 3. Latches 52 extend inwardly from access cover 30 at a location which generally corresponds to the location of cams 44. One latch 52 is provided for each set of cams 44, i.e. one latch 52 is generally located immediately above each shaft 46.

Latches 52 will clear the cam 44 located closest to cover 30 only when the cams are in their operative solid line position. See FIG. 3. If the cams 44 are sticking up in their inoperative position, meaning that the filter elements 20 have not yet been locked against wall 10, then the latches 52 will abut the cams 44 located adjacent cover 30. This prevents cover 30 from being installed on the dirty air plenum 6. Only when all the cams 44 have been rotated downwardly will the latches 52 clear the cams and allow cover 30 to be installed. Thus, interlock means 50 is an important safety feature. It prevents the operator from installing the access cover 30 and conducting an air filtering operation when he has inadvertently failed to lock all the filter elements 20 in place. In addition, interlock means 50 prevents the cams 44 from accidentally rotating to an inoperative position during normal operation.

Supporting means 34 as described herein is particularly simple and efficient. In order to install the filter elements 20, it is only necessary to roll the filter elements 20 down the support members 36 until they are seated in their respective recesses 40. Then, simply by rotating the shafts 46 and hence cams 44, filter elements are transversely slid until they firmly engage against dividing wall 10. In addition, the latches 52 insure that an air filtering operation will not take place unless all of the filter elements 20 are properly locked in place by rotation of cams 44. Thus, the supporting means 34 described herein can be used to quickly and easily install filter elements 20 in dirty air plenum 6. Since filter elements 20 will have to be replaced from time to time, the ease with which the supporting means 34 allows such replacement is obviously desirable.

Another aspect of this invention relates to a pulse jet cleaning means for the air filters 20 which is generally indicted as 60 in FIGS. 1 and 2. Cleaning means 60 includes a source of compressed gas under a suitably high pressure. This source of gas is preferably a compressed air manifold 62 located on the exterior of clean air plenum 8. A plurality of valves 64 have their inlets connected by conduits 66 to the compressed air manifold 62. The outlets of valves 64 are connected by elongated conduits 68 to nozzles 70. See FIG. 3. One valve 64 and one nozzle 70 is provided for each of the filer elements 20.

Each nozzle 70 is located inside clean air plenum 8 on any suitable support rod 72 or the like. As shown in FIG. 1, each nozzle 70 points along a longitudinal axis 74 through the center of each cylindrical filter element 20. Nozzles 70 are suitable for directing cleaning jets of compressed gas along the axes 74. These cleaning jets are normally high pressure air since the compressed gas in manifold 62 comprises a high pressure air. Control means (not shown) are provided for periodically operating the valves 64 to periodically pulse jets of compressed air through the filter elements in a reverse back flow direction. This direction is indicated by the arrows B in FIG. 7. This is a typical structure and method of operation for a pulse jet self-cleaning air filter.

This invention relates generally to the use of a diffuser means indicated as 80. Diffuser means 80 comprises a V-shaped deflector plate 82 located between each nozzle 70 and the corresponding outlet opening 12. Deflector plate 82 has an apex 84 and two outwardly angled sides 86 and generally the design of the deflector plate is symmetrical. Deflector plates 82 are located inside the clean air plenum 8 a substantial distance from the outlet openings 12 and wall 10. The leading edge of the diffuser, the apex 84, is preferably located a distance less than two element opening diameters from the outlet opening 12, indicated in FIG. 7 by the letter Y. It also is preferably located on the element axis.

Preferably, deflector plates 82 comprise sheet metal fabrications which extend from the top of clean air plenum 8 to the bottom. A single elongated angle forms the deflector plates 82 for two nozzles 70 since the nozzles 70 are generally in line corresponding to the in line orientation of the various filter elements 20 in the two vertically spaced rows. See FIG. 3. Deflector plates 82 diffuse or spread out the cleaning jet of gas to substantially fill the cross-sectional area of the outlet opening 12 and hence filter elements 20. In other words, diffuser means 80 converts the relatively low volume, high pressure cleaning jet issuing from the nozzles 70 to a low pressure, high volume cleaning jet. In addition, diffuser means 80 directs the cleaning jets radially towards the inner circumferences of the filter elements 20 to form a more effective cleaning jet, i.e. the jet is directed directly against filter medium 26.

The impacted interior area is the most heavily loaded area of the filter element, as will be explained hereafter, and it is this area which must be cleaned to achieve effective operation of the filter. To direct the cleaning jet into this crucial area requires a spatial relationship between the deflector plate 82 and the filter element 20 which is represented by the following formulae:

$$(Y + Z) \tan \frac{\theta}{2} = \frac{X}{2}$$

where $0 \leq Z \leq \frac{H}{2}$ and $\frac{H}{X} \leq 5$

Where in referring to FIG. 7 it can be understood Y is the distance from the apex 84 to the outlet opening 12, Z is the distance from the opening 12 up to the midpoint of the filter element 20 impinged most directly by the cleaning jet, $\theta$ is the included angle of the deflector plate 82, X is the inside diameter of the filter element 20, and H is the length of the filter element. The symmetrical design of the deflector plate 82 and the use of a pleated media filter element 20 having a length/inside diameter ratio of five or less, spaced apart in accordance with the above-stated formula relationship will result in the cleaning jet substantially impacting the filter element 20 along the interior area of the element between the outlet opening 12 and the midpoint of the element 20 as can be seen in FIG. 7. In addition, a quantity of the low pressure surrounding gas in plenum 8 will be entrained with the cleaning jet and can be used in the cleaning of the filter element, as is typical in the case of a venturi type of pulse jet cleaning system.

The particular diffuser means 80 noted herein is advantageous because it replaces the venturi which is conventionally used in a pulse jet type of self-cleaning air filter. This greatly decreases the size needed for clean air plenum 8 and allows a compact air filter design. Such compactness is important in high performance air filter applications. In addition, there is no longer any appreciable pressure drop encountered by the normal air flow during an air filtering operation since a venturi is no longer used. Thus, the deflector plate 82 provides all of the advantages of a conventional venturi, i.e. it entrains secondary gas to aid in reverse flow cleaning, but it does not have any of the disadvantages of the venturi or the other deflectors commonly known in the prior art. It also has the additional advantage of directing the cleaning air radially outward toward a substantial plurality of filter media, thereby more effectively utilizing the compressed air than other deflector/element systems known in the art.

Thus, the important design criteria for the deflector plates 82 include the fact that it is located in the clean air plenum 8 sufficiently far above the outlet openings 12 to not pose any appreciable obstruction to the flow of air therethrough. In addition, the design of the deflector plate and its distance from the nozzles 70 has to be selected to insure that the cleaning jets substantially fill the cross-sectional area of the outlet openings 12 at the location of the separating wall 10. Test results indicate that the quality of the cleaning jet is dependent on the percentage of the outlet opening 12 which is "filled" by the cleaning jet. Unless substantially all of the outlet opening 12 is filled by the cleaning jet, at least some of the air which is otherwise present inside filter element 20 will not be carried along in the backflow through the medium. This air will thus leak out of the outlet opening 12 in the direction A even when the cleaning jet is in operation. This is a disadvantageous result, which is avoided by the particular geometry of the invention as shown in FIGS. 7 and 8. Referring particularly to FIG. 8, the length of a side of the diffuser deflector plate 82 is designated by the letter L; the included angle of the deflector plate is represented by the symbol $\theta$, and the inside diameter of the nozzle is indicated by C. The projected cross-sectional width of the diffuser as projected into the cleaning jet flow is represented by the letter W, where $W = 2L \sin \theta/2$. In order to spread the cleaning jet flow sufficiently to substantially fill the outlet opening 12, the ratio of C/W has been determined to be most effective at a value of 4 or less. If the inside diameter C of the jet discharge nozzle is much larger than the projected cross-sectional diffuser width W, the jet will not spread satisfactorily and air will leak out of the opening 12 in the direction of the clean air plenum during the cleaning operation.

Another important advantage of the present invention should be emphasized. It has been found that the present invention cleans the filter element 20 better than a venturi type system even though the amount of compressed air used in the cleaning jets is comparable. Since a venturi does not impart a significant radial velocity to the cleaning jet, most of the air is directed to the closed end of the element where it is then deflected outward by the end cap. The cleaning jet which is formed by the venturi is, therefore, less effective near the open end of the filter element and more effective at the closed end thereof. By open end of the filter element it is meant that end which is adjacent outlet opening 12. Unfortunately, the filter elements 20 tend to load or cake with dust more heavily near the open end rather than the closed end. This is due to the fact that the axial velocity inside a filter element will always be higher near the filter's open outlet causing a lowered static pressure in that area. A lower static pressure causes a higher air flow which brings more dust to the outlet end resulting in a greater loading of the element in this area. The cleaning jet formed by the deflector plate 82 tends to clean the open end of the filter element much more effectively than the venturi since the cleaning jet is better directed and more fully expanded at the open end of the element when the deflector plates 82 are used with the geometry described above. This results in superior life for the pleated media filter element 20 even when equal amounts of compressed air are being used. Superior cleaning of the filter elements by the present invention near the open end of the filter element has been verified by observing deposits on the filter element at the conclusion of life tests.

Another feature of the present invention is that the filter elements 20 are horizontally arranged inside the dirty air plenum 6 and that the air intake 14 is located in the top wall of plenum 6. In addition, the hopper 17 which collects the contaminants released from the filter elements is located generally beneath the elements. Thus, the normal air inflow through air intake 14 will be in a generally vertical downward direction before the flow enters into the elements 20 and is carried through the outlet openings 12. Consequently, whenever the cleaning jets have been used to release dust or other contaminants from the filter elements 20, the normal air flow through the air filter 2 tends to carry those contaminants downward into the hopper 17. Thus, the arrangement of the components mentioned above serves to ensure that all the contaminants released from the filter element 20 will be collected in the hopper 17 where they may be later removed.

Referring now to FIGS. 3-6, another feature of the invention will be described. It has been found that dust will eventually cause the filter elements 20 to become so contaminated that they must be replaced. During such replacement, the cams 44 are rotated to an inoperative position, the filter elements 20 are moved laterally to their dotted line positions in FIG. 5, and are than rolled outwardly from plenum 6. During this removal process, it has been found that dust which is caked near the open end of the filter element 20, i.e. around the end plate 24 and gasket 28, will tend to be released from that end of the filter element and fall through the outlet opening 12 into the clean air plenum 8. This dust will then be carried into the engine with which the air filter 2 is used when the air filter is next put into operation. This is an obviously undesirable result as it defeats the very purpose of air filter 2.

To prevent the above-identified problem from occurring, the present invention utilizes a plurality of semicircular baffles, each of which is generally indicated as 90, around each of the outlet openings 12. Referring to FIG. 4, only one such baffle 90 is shown in solid lines around one opening 12 although it should be understood that six such baffles for each of the six openings 12 are provided. See FIG. 3. Baffles 90 are slightly larger in diameter than the diameter of the filter element 20 and closely surround the top half of the open end of filter element 20. These baffles prevent dust from accumulating in large quantities around the open end and prevent that dust from entering into the clear air plenum 8 when the filter elements 20 are replaced. Thus, baffles 90 serve as an effective means for preventing any dust contamination of clean air plenum 8 during filter element replacement.

However, use of the baffles 90, which is desirable, but which is not strictly necessary to the basic principles of this invention, complicate somewhat the task of removing the filter elements 20. This complication arises because the end plates 22 and 24 on each of the filter elements tend to "catch" or hang up on either the cams 44 or the baffles 90 respectively. To prevent this, a plurality of outwardly extending tabs 92 are located between each of the baffles 90 on the separating wall 10. Tabs 92 extend outwardly from wall 10 a greater distance than the baffles 90 and thus effectively prevent the end plates 24 from catching on the baffles 90. In addition, an elongated guide member or rail 96 is mounted on that face of the cams 44 which is vertical when the cams are in their inoperative position as shown in dotted lines in FIG. 5. Rail 96 spans and is attached to all of the cams 44 on any given shaft. The rail 96 serves to engage the end plate 22 and guide that end plate in a direction away from the cams 44 to straighten the filter element 20 whenever the filter element has a tendency to become cocked relative to support members 36. Obviously, the distance between the end of the tabs 92 and the rail 96 during removal of the filter element 20 must be slightly greater than the length of the filter element.

In addition, use of the outwardly protruding tabs 92 is also advantageous for another reason. For example, if one of the filter elements 20 is not properly seated in one of the opposed pairs 37, 38, and 39 of recesses 40, it might be possible nonetheless to rotate the cams 44 to their operative position by laterally pushing the filter elements 20 towards the dividing wall 10. Thus, operation of the filter 2 could conceivably take place even when one or more of the filter elements 20 was not properly seated and sealed around the outlet opening 12. However, by using the outwardly protruding tabs 92, any substantial lateral movement of the filter element 20 is stopped by virtue of the engagement of the end plate 24 with one of the tabs 92. Thus, unless each of the filter elements 20 is properly seated in the recesses 40, it becomes impossible to actuate the cams 44 to their solid line operative position. Such an indication would mean that one of the elements 20 was misaligned inside plenum 6 and would be a valuable safety feature for operating the filter 2.

Various modifications of this invention will be apparent to those skilled in the art. For example, the diffuser means 80 may comprise a cone or other type of form which will cause effective diffusion of the jet, i.e. a pyramidal shape. However, in order for the diffuser means 80 to be most effective, the filter element length/inside diameter ratio must be less than 5/1. This then usually dictates the use of pleated media filter elements in order to obtain enough filter surface in the compact space of a high performance application. The support members 36 are preferably perforated rather than being solid over the length thereof. This prevents dust from becoming built up on the support members 36 which would otherwise hamper removal of used filter elements 20 from the air filter 2. Thus, the scope of this invention is to be limited only by the appended claims.

What is claimed is:

1. In a self-cleaning air filter of the pulse-jet type having a housing which includes a dirty air plenum separated from a clean air plenum therein by a partition having an outlet opening therein, at least one pleated medium filter element mounted in said dirty air plenum flush with said partition and having a length, a closed first end, a second end having an opening aligned with said partition outlet opening for communication with said clean air plenum, and a hollow interior, and pulse-jet cleaning means mounted in said clean air plenum for providing a high pressure, low volume cleaning jet of gas, wherein the improvement comprises:

at least one nozzle connected to said pulse-jet cleaning means, said nozzle being positioned in said clean air plenum and directed towards said outlet opening and said filter element; and a diffuser mounted between said nozzle and said filter element opening, said diffuser having an apex directed towards said nozzle, a side L, an included angle $\theta$, and being constructed and arranged to convert said high pressure, low volume jet of gas to a relatively lower pressure, higher volume jet of gas and to direct the lower pressure, higher volume jet of gas into said pleated medium of said filter element near said element opening;

said nozzle and said diffuser being positioned relative to each other such that the high pressure low volume cleaning jet is directed to substantially fill said element opening and impinge on said filter medium along said element interior between the midpoint of said element length and said element opening;

said nozzle and diffuser being positioned so as to not substantially restrict air flow through said element opening.

2. In the self-cleaning air filter of claim 1, wherein said diffuser further includes a projected cross-sectional width W, said diffuser being constructed such that W is equal to a value represented by the formula $2L \sin(\theta/2)$.

3. In the air filter of claim 2 wherein said nozzle has an inside diameter, and the ratio of said inside diameter to said diffuser cross-sectional width is four or less.

4. In the air filter of claim 1 wherein said filter element opening has a diameter and said diffuser apex is positioned from said partition outlet opening a distance less than twice the diameter of said filter element opening.

5. In the self-cleaning air filter of claim 1, wherein said filter element has a circular cross-section and an inside diameter, and said diffuser and said filter element are mounted relative to each other such that a value equivalent to said inside diameter of the filter element is twice the value represented by the formula $([X]Z+Y) \tan \theta/2$, where Y is the distance from said diffuser apex to said outlet opening and Z is a distance greater than zero but less than one-half the length of said filter element.

6. A self cleaning air filter of the pulse jet type for use in a high-performance application, comprising:

a housing including an intake communicating with a dirty air plenum and an outtake communicating with a clean air plenum;

partition means in said housing for separating said dirty air plenum from said clean air plenum, said partition means including at least one circular outlet opening therein;

at least one, generally cylindrical, pleated medium filter element constructed to filter relatively high velocity air flows, said filter element having a longitudinal axis, a length, a circular opening, and is disposed in said dirty air plenum, mounted flush with said partition means and in fluid communication with said outlet opening therein;

means for generating a high pressure, low volume cleaning jet of gas, said generating means including at least one nozzle positioned in said clean air plenum, said nozzle being coaxially directed towards said outlet opening and associated filter element; and diffuser means, mounted between said generating means and said outlet opening, for converting said high pressure, low volume jet of gas to a relatively lower pressure, higher volume jet of gas, said diffuser means including a substantially symmetrical deflector constructed and arranged to spread said cleaning jet outwardly near said outlet opening and into said filter element opening in a manner which causes said jet of gas to impact the filter element medium near said filter element opening;

said deflector having an apex, a side having a length L, a projected cross-sectional width W, and an included angle $\theta$, said apex being positioned in-line with said nozzle and associated filter element and at a distance from said outlet opening less than a value equal to two inside diameters of said filter element opening;

said deflector being constructed in a manner in which said projected cross-sectional width W is equal to a value represented by the formula $2L \sin(\theta/2)$; and said deflector and said filter element being mounted relative to each other, such that a value equivalent to an inside diameter of said filter element is twice the value represented by the formula $(Y+Z) \tan \theta/2$, where Y is the distance from said deflector apex to said outlet opening and Z is a distance greater than zero but less than one-half said filter element length.

7. The self-cleaning filter of claim 6 wherein said filter element has a length to inside diameter ratio not greater than five.

8. The self-cleaning filter of claim 6 wherein said nozzle has an inside diameter of a value less than four times the projected cross-sectional width of said deflector.

9. A self-cleaning air filter of the pulse jet type for use in high-performance applications, comprising:

a housing including an intake communicating with a dirty air plenum and an outtake communicating with a clean air plenum;

partition means in said housing for separating said dirty air plenum from said clean air plenum, said partition means including at least one circular outlet opening therein;

at least one generally cylindrical pleated medium filter element for filtering relatively high velocity air flows, said filter element being disposed in said dirty air plenum and having a circular opening and an inside diameter, said opening being mounted flush with said partition means and in fluid communication with said partition means outlet opening, and further including a longitudinal axis, and a length to inside diameter ratio no greater than five;

means for generating a high pressure, low volume cleaning jet of gas, said generating means including at least one nozzle positioned in the clear air plenum, said nozzle having an inside diameter and being coaxially directed towards said outlet opening and associated filter element; and diffuser means, mounted between said generating means and said outlet opening and associated filter element, for converting said high pressure, low volume cleaning jet of gas to a relatively lower pressure, higher volume cleaning jet, said diffuser means being constructed and arranged to spread said cleaning jet outwardly near said partition means outlet opening and into said filter element opening in a manner which causes said jet of gas to impact the medium near said filter element opening, said diffuser means including a deflector, of generally V-shaped cross section having an apex, a side of length L, an included angle $\theta$, and a projected cross-sectional width W, said apex being positioned in-line with said nozzle and corresponding filter element and at a distance from said partition means outlet opening less than a value equal to two inside diameters of said filter element opening, said projected cross-sectional width being equal to a value represented by $2L \sin (\theta/2)$;

further, said deflector and said filter element being mounted relative to each other such that the high pressure, low volume cleaning jet is directed to substantially fill said filter element opening and impinge on said filter medium near said filter element opening, said inside diameter of said filter element being equal to twice the value of $(Y+Z) \tan \theta/2$, where Y is the distance from said deflector apex to said outlet opening, and Z is a distance equal to or greater than zero but less than one-half the length of said filter element;

said inside diameter of said nozzle is less than four times the projected cross-sectional width of said deflector; and said nozzle and said deflector being positioned so as to not substantially restrict air flow through said filter element opening.

* * * * *

UNITED STATES PATENT AND TRADEMARK OFFICE
CERTIFICATE OF CORRECTION

PATENT NO. : 4,452,616

DATED : 5 June 1984

INVENTOR(S) : Gary R. Gillingham, et al.

It is certified that error appears in the above-identified patent and that said Letters Patent is hereby corrected as shown below:

In Claim 5, column 12, line 57, "([X]Z+Y)" should be --(Z+Y)--.

Signed and Sealed this

Nineteenth Day of February 1985

[SEAL]

Attest:

DONALD J. QUIGG

Attesting Officer     Acting Commissioner of Patents and Trademarks